2,881,157
Patented Apr. 7, 1959

2,881,157
SUBSTITUTED AMIDE-1,4-DIACYLPIPERAZINE COMPLEXES

Robert C. O'Neill, New York, N.Y., assignor to Merck & Co., Inc., Rahway, N.J., a corporation of New Jersey No Drawing. Application October 18, 1956
Serial No. 616,603

4 Claims. (Cl. 260—96.5)

This invention relates to novel substituted amide-1,4-diacylpiperazine complexes and to the processes for preparing these novel compounds.

It has been found that these substituted amide-1,4-diacylpiperazine complexes possess marked and effective action in the control and treatment of the disease coccidiosis which infects poultry.

The novel substituted amide-1,4-diacylpiperazine complexes may be represented by the following structural formula

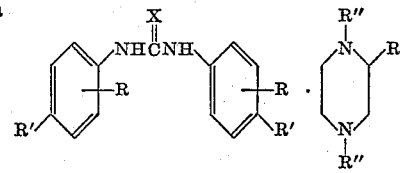

wherein R is hydrogen or a lower alkyl group, R' is an electron withdrawing group, R" is a member selected from the group consisting of formyl and acetyl groups, and X is oxygen or sulfur.

The substituted amide-1,4-diacylpiperazine complexes are new chemical compounds. They have been found to be formed of 2 molar equivalents of the substituted amide and 1 molar equivalent of 1,4-diacylpiperazine. The complexes have their own characteristic properties that are markedly different from the component parts and are not mere mixtures of a substituted urea and a 1,4-diacylpiperazine.

These novel substituted amide-1,4-diacylpiperazine complexes are produced by reacting a substituted urea compound represented by the formula

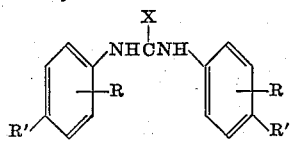

wherein R is hydrogen or a lower alkyl group, R' is an electron withdrawing group and X is oxygen or sulfur, with a 1,4-diacylpiperazine represented by the formula

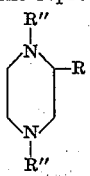

wherein R is as defined above and R" is a member selected from the group consisting of formyl and acetyl groups.

The substituted amide compounds which may be employed as one of the starting materials in this process are carbanilide compounds having an electron withdrawing group in either or both of the 4 and 4'-positions of the rings. Examples of electron withdrawing groups which may be used are nitro, cyano, carboxy, carboalkoxy, acetyl, trimethyl ammonium, sulfonic acid and carbamide groups. Such groups are alternatively referred to as meta directing (see Fieser and Fieser, "Organic Chemistry," 2d edition, 1950, page 595). Specific carbanilide compounds which may be employed include 4,4'-dinitrocarbanilide; 2-methyl-4,4'-dinitrocarbanilide; 4-nitro-4'-cyanocarbanilide; and 4-nitro-4'-acetocarbanilide.

The 1,4-diacylpiperazine compounds which may be employed in accordance with this invention include 1,4-diformylpiperazine; 1,4-diacetylpiperazine and 1,4-diacetyl-2-methylpiperazine.

The specific, and, therefore, unpredictable, nature of the present invention is apparent from the fact that the parent 1,4-diazine itself, i.e., piperazine, is inoperative for the purposes of this invention. Indeed, the unusually specific nature of the R" substituent is further borne out by the fact that the next higher homolog of the diacetyl derivative, i.e., the 1,4-dipropionylpiperazine, is also inoperative.

In accordance with one procedure for carrying out the process of this invention, the solid substituted urea compound is reacted with a solution of the 1,4-diacylpiperazine. The reaction mixture in which the substituted urea compound is insoluble or very slightly soluble is stirred until the insoluble complex is formed. Complexing commences within a few minutes as evidenced by a distinct lightening in color of the suspended solid, and by the substantial increase of slurry. The resulting complex is then filtered, washed and dried.

Ethers such as dioxane and ethyl ether, alcohols such as the lower aliphatic alcohols, hydrocarbons such as benzene, toluene, water and mixtures of such solvents may be employed satisfactorily. It has been found advantageous to employ a solvent in which the 1,4-diacylpiperazine is soluble and in which the substituted urea is insoluble.

Alternately, para-nitrophenylisocyanate may be treated with water in the presence of the 1,4-diacylpiperazine. The 4,4'-dinitrocarbanilide thus formed reacts with the 1,4-diacylpiperazine to form the 1,4-diacylpiperazine·4,4'-dinitrocarbanilide complex.

As the substituted urea compound it is preferred to employ 4,4'-dinitrocarbanilide, although, other carbanilides having different electron wihdrawing groups in the 4 and 4'-positions may be used. Typical substituents which may be present in these positions are nitro, cyano, carboxy and carboalkoxyl radicals. Furthermore, the electron withdrawing groups of the 4 and 4'-positions need not be the same. Thus typical examples of 4,4'-disubstituted carbanilides useful in this invention are 4,4'-dinitrocarbanilide; 4,4'-dicyanocarbanilide; and 4-nitro-4'-cyanocarbanilide.

The 1, 4-diacylpiperazine · substituted urea complexes prepared in accordance with this invention are active against the widespread poultry disease commonly called "Coccidiosis" which is caused by species of protozoan parasites of the genus Eimeria. In this regard, *E. tenella* is responsible for a severe and frequently fatal infection of the cecum of chickens. Furthermore, other serious infections are caused in fowl by other species of Eimeria and especially *E. acervulina, E. necatrix, E. maxima,* and *E. brunetti.* If left untreated, such infections often cause extensive losses of fowl. The elimination or control of coccidiosis is, therefore, of the utmost importance for successful poultry raising.

According to a further embodiment of this invention, novel compositions useful in the treatment of coccidiosis are provided containing a 1, 4-diacylpiperazine · substituted urea complex as an active ingredient. These compositions comprise a 1, 4-diacylpiperazine · substituted urea complex intimately combined with an inert carrier. In this regard compositions which contain a compound of the formula

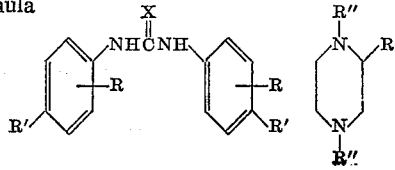

where R, R', R" and X have the same significance as already noted, in a proportion of 2 moles of the substituted urea to 1 mole of the 1, 4-diacylpiperazine, as the active ingredient have been found to be particularly useful against coccidiosis.

These compositions comprise at least one of the 1, 4-diacylpiperazine · substituted urea complexes mentioned above combined with an inert carrier or diluent. Such compositions are conveniently produced by intimately dispersing the active ingredient throughout a carrier. The carrier or diluent may be either liquid or solid. Liquid dispersions can be prepared satisfactorily by using emulsifiers and surface active agents. Any solid can be used as a carrier which is inert toward the active compounds and which can be administered to animals with safety. Examples of suitable carriers are ground oyster shells, attapulgus clay and edible vegetable materials such as commercial animal and poultry feeds, urea, corn meal, ground corn, citrus meal, fermentation residues and distillers dried grains. The active ingredient is conveniently dispersed in a solid carrier by conventional methods such as stirring, tumbling, and grinding. In this manner, by selecting different carriers and by altering the ratio of carrier to active ingredient, compositions of varying concentration can be prepared. Compositions very suitable for addition to poultry feed may contain from about 5% to about 40% of the new coccidiostat, and preferably about 10–25%, adsorbed on or mixed with a carrier.

Premixes of 4, 4'-dinitrocarbanilide · 1, 4-diacetylpiperazine may be prepared as referred to above in a general manner. Two satisfactory formulations are described in detail below.

A. Ingredients:
 (a) 4, 4'-dinitrocarbanilide · 1, 4-diacetylpiperazine complex
 (b) Corn distillers dried grains
 (c) Wheat shorts
 (d) Dried vitamin $B_{12}$ fermentation solubles

*Composition.*—Each pound of the mixture preparation contains 0.30 pound of coccidiostat drug. In order to prepare 1000 pounds of feed premix the following quantities are employed:
 (a) 300 pounds 4, 4'-dinitrocarbanilide · 1, 4-diacetylpiperazine
 (b) 175 pounds corn distillers dried grains (through 30 mesh screen)
 (c) 455 pounds wheat shorts (30–80 mesh)
 (d) 70 pounds dried vitamin $B_{12}$ fermentation solubles (30–80 mesh)

The total amounts of wheat shorts and fermentation solids, and about 150 pounds of corn grains are mixed followed by the drug and the remainder of the corn grains. After mixing for about two hours the material is ready for packaging.

B. Ingredients:
 (a) 4, 4'-dinitrocarbanilide · 1, 4-diacetylpiperazine
 (b) Corn distillers dried grains
 (c) Wheat shorts
 (d) Dried vitamin $B_{12}$ fermentation solubles

*Composition.*—Each pound of the mixture contains 0.25 pound of coccidiostat.

*Preparation.*—The following quantities are employed in order to make 995 pounds of product:
 (a) 250 pounds 4, 4'-dinitrocarbanilide · 1, 4-diacetylpiperazine
 (b) 188 pounds corn distillers dried grains (through 30 mesh screen)
 (c) 487 pounds wheat shorts (30–80 mesh)
 (d) 70 pounds dried vitamin $B_{12}$ fermentation solubles (30–80 mesh)

Products such as the above are suitable for incorporation into poultry feedstuffs in order to obtain the desired dosage level of active drug.

The amount of active ingredient required for effective prophylactic control of coccidiosis is very low. With regard to poultry, good results have been obtained by the administration of a quantity of the active ingredient equal to about .005% to about .05% of the food consumed. Optimum results are usually obtained by the daily administration of a quantity of active ingredient equal to about .0075% to about .025% of the food consumed. Such relatively small amounts may be conveniently incorporated in the normal ration prior to feeding the poultry. Larger concentrations of up to about 0.1% of the active ingredient may be employed therapeutically if an outbreak of the disease is encountered.

The coccidiostatic activity of compositions containing various 1,4-diacylpiperazine substituted urea complexes was experimentally demonstrated according to the following test:

Groups of 10 two-week chicks were fed a mash feed containing from 0.01% to 0.04% of the active ingredient uniformly dispersed therein. After existing on the diet for 24 hours, each chick was inoculated with 50,000 sporulated oocysts of *E. tenella*. In addition, groups of 10 chicks were also infected but fed a diet free of the active ingredient and used as positive controls. Still other groups were treated separately with the substituted urea compound and the 1,4-diacetylpiperazine compound and with physical mixtures of the substituted urea compound and the 1,4-diacylpiperazine compound. The experiment was terminated after administering the respective diets for seven days after inoculation and the following results were obtained. The oocyst count (number of parasites of *E. tenella* remaining) was determined by sacrificing the birds and examining the infected organs microscopically. The results are given in Table I.

TABLE I. ANTIOCCIDIAL TESTING RESULTS

| Compound | Percent Compound In Diet | Percent Mortality | | Oocyst Count $\times 10^{-4}$ | | Percent Weight Gain | |
|---|---|---|---|---|---|---|---|
| | | Treated | Untreated | Treated | Untreated | Treated | Untreated |
| 4,4'-dinitrocarbanilide | 0.1 | 0 | 40 | 20 | 34 | 60 | 45 |
| | 0.05 | 0 | 40 | 28 | 34 | 66 | 45 |
| | 0.025 | 20 | 40 | 29 | 34 | 54 | 45 |
| 4,4'-dinitrocarbanilide·1,4-diacetylpiperazine complex. | 0.0062 | 5 | 23 | 10.2 | 16.0 | 35 | 16 |
| | 0.0125 | 0 | 23 | 0.5 | 16.0 | 44 | 16 |
| | 0.025 | 0 | 19 | <0.1 | 15.1 | 46 | 22 |
| | 0.1 | 0 | 10 | 0.1 | 12.8 | 9 | 34 |
| 4,4'-dinitrocarbanilide·1,4-diformylpiperazine complex. | 0.0062 | 0 | 43 | 21.6 | 19.9 | 34 | 6 |
| | 0.01 | 0 | 43 | 3.1 | 19.9 | 35 | 6 |
| | 0.0125 | 0 | 23 | 1.7 | 24.8 | 45 | 17 |
| | 0.025 | 0 | 3 | <0.1 | 29.7 | 54 | 28 |
| | 0.05 | 0 | 3 | <0.1 | 29.7 | 43 | 28 |
| 4,4'-dinitrocarbanilide·1,4-diacetyl-2-methylpiperazine complex. | 0.0062 | 25 | 23 | 7.6 | 18.6 | 31 | 11 |
| | 0.01 | 0 | 18 | 11.3 | 20.7 | 49 | 12 |
| | 0.0125 | 0 | 23 | 2.2 | 18.0 | 48 | 10 |
| | 0.025 | 0 | 25 | <0.1 | 16.5 | 46 | 10 |
| | 0.05 | 0 | 23 | <0.1 | 17.0 | 43 | 9 |

It will be noted from Table I that 4,4'-dinitrocarbanilide when administered separately does have activity, but such activity does not approach that displayed by the complex. The 1,4-diacylpiperazines are inactive.

The following examples are intended to be illustrative only and may be varied or modified without departing from the spirit and scope of this invention.

*Example I.—4,4'-dinitrocarbanilide·1,4-diacetylpiperazine complex*

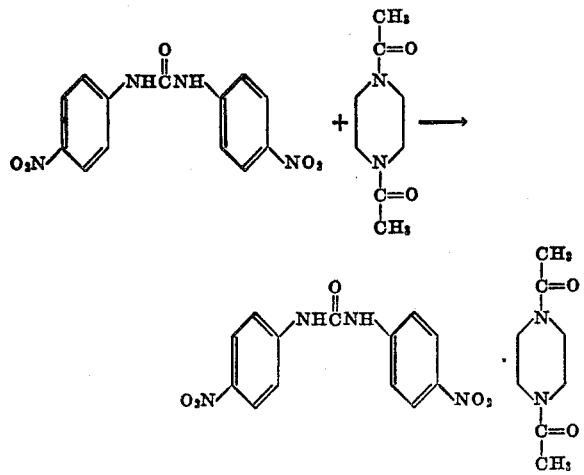

Nine and thirty-five hundredths (9.35) grams (0.055 mole) of diacetylpiperazine was dissolved in a mixture of methanol (50 ml.) and ether (50 ml.) at room temperature (about 25° C.). Then 15.1 grams (0.05 mole) of 4,4'-dinitrocarbanilide was added with stirring.

Complexing commenced within a few minutes as evidenced by a distinct lightening in color of the suspended solid, and by the substantial increase in viscosity of the suspension.

The slurry was stirred overnight at room temperature, and the greenish-yellow complex was collected by filtration, washed with ether, and dried to constant weight.

The yield of the 4,4-dinitrocarbanilide·1,4-diacetylpiperazine complex, in the ratio of 2 moles of the carbanilide to 1 mole of the substituted piperazine was 18.4 grams, or 95% of theory.

*On analysis.*—Calculated for $C_{34}H_{34}O_{12}N_{10}$: C, 52.7; H, 4.38; N, 18.08. Found: C, 52.72; H, 4.40; N, 18.43.

*Example II.—4,4'-dinitrocarbanilide·1,4-diformylpiperazine complex*

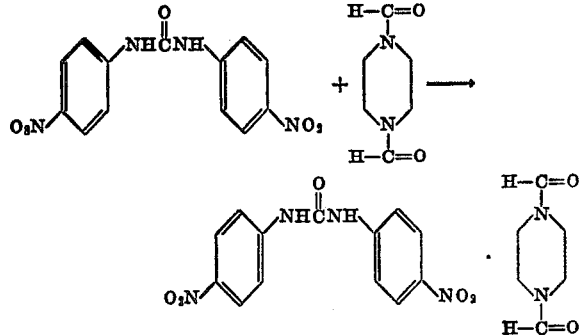

A slurry of 15.6 g. of N,N'diformylpiperazine (JACS, 77, 753, 1955), 30.2 g. of dinitrocarbanilide and 200 ml. of methanol was stirred at room temperature for eight hours. The solid material was removed by filtration and rinsed once with methanol. The dry complex weighed 35 g. and melted and decomposed about 290–295°.

*Analysis.*—Calculated for $C_{26}H_{20}N_8O_{16} \cdot C_6H_{10}N_2O_2$: C, 51.47; H, 4.05. Found: C, 50.89; H, 4.40.

The complex is composed approximately of 2 moles of dinitrocarbanilide and one mole of diformylpiperazine.

*Example III.—4,4'-dinitrocarbanilide·1,4-diacetyl-2-methylpiperazine complex*

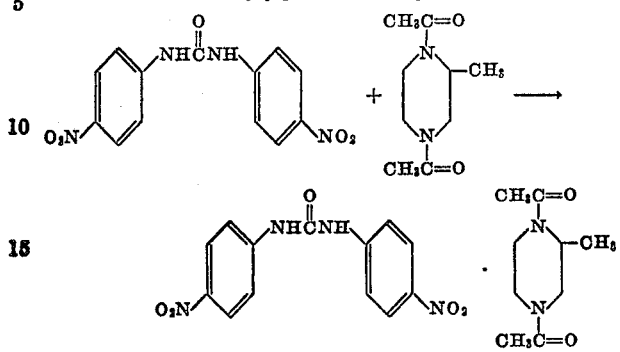

To 20 g. of 2-methylpiperazine was added 100 ml. of acetic anhydride. The mixture was heated under reflux for three hours and then the solvent was distilled off at about 70 mm. pressure. The residue was crystallized from ethyl acetate to give N,N'-diacetyl-2-methylpiperazine, M.P. 118–119°.

*Analysis.*—Calculated for $C_9H_{16}N_2O_2$: C, 58.67; H, 8.75. Found: C, 59.25; H, 9.18.

A slurry of 30.2 g. of 4,4'-dinitrocarbanilide, 20.2 g. of N,N'diacetyl-2-methylpiperazine and 150 ml. of methanol was stirred at room temperature for nine hours. The product was removed by filtration and rinsed once with methanol to give 36.4 g. M.P. about 275–285°.

*Analysis.*—Calculated for $C_{26}H_{10}N_4O_5 \cdot C_9H_{16}N_2O_2$: C, 53.30; H, 4.60. Found: C, 53.12; H, 4.29.

The complex is composed approximately of 2 moles of dinitrocarbanilide and one mole of diacetyl-2-methylpiperazine.

Various changes and modifications may be made in carrying out the present invention without departing from the spirit and scope thereof. Insofar as these changes and modifications are within the purview of the annexed claims, they are to be considered as part of this invention.

What is claimed is:

1. A chemical complex of

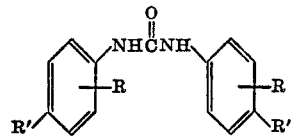

and

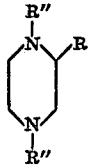

wherein R is selected from the group consisting of hydrogen and a lower alkyl group, R' is an electron withdrawing group selected from the group consisting of nitro, cyano, carboxy, carboalkoxy, acetyl, trimethyl ammonium, sulfonic acid and carbamide radicals and R" is selected from the group consisting of formyl and acetyl groups.

2. 4,4' - dinitrocarbanilide·1,4 - diacetylpiperazine complex.

3. 4,4'-dinitrocarbanilide·1,4 - diformylpiperazine complex.

4. 4,4' - dinitrocarbanilide·1,4 - diacetyl - 2 - methylpiperazine complex.

References Cited in the file of this patent

Cuckler et al.: Science, 122, 244–5 (1955).